United States Patent [19]
Monnier

[11] Patent Number: 5,955,960
[45] Date of Patent: Sep. 21, 1999

[54] TAMPER RESISTANT ELECTRONIC LOCK AND METHOD OF USING SAME

[75] Inventor: Jean-Luc Monnier, La Chaux-de-Fonds, Switzerland

[73] Assignee: Jean-Luc Monnier, Switzerland

[21] Appl. No.: 08/823,441

[22] Filed: Mar. 24, 1997

[51] Int. Cl.[6] .............. G06F 7/04; G07B 15/00; H05K 7/20; E05B 37/00
[52] U.S. Cl. .................. 340/825.31; 235/38.2; 361/704; 70/286
[58] Field of Search .......... 340/825.31; 70/21, 70/276, 286, 3, 277, 278, 271; 235/38.2; 361/704, 118, 111

[56] References Cited

U.S. PATENT DOCUMENTS

| | | | |
|---|---|---|---|
| Re. 35,077 | 10/1995 | Allina | 361/56 |
| 3,754,164 | 8/1973 | Zorzy | 235/38.2 |
| 3,904,934 | 9/1975 | Martin | 317/101 D |
| 4,450,496 | 5/1984 | Doijack et al. | 361/58 |
| 4,459,632 | 7/1984 | Nijman et al. | 361/56 |
| 4,931,895 | 6/1990 | Allina | 361/56 |
| 4,972,295 | 11/1990 | Suguro et al. | 361/386 |
| 5,045,924 | 9/1991 | Ikegame | 357/81 |
| 5,148,351 | 9/1992 | Patel | 361/388 |
| 5,150,271 | 9/1992 | Unterweger et al. | 361/319 |
| 5,327,318 | 7/1994 | Popat et al. | 361/55 |
| 5,444,287 | 8/1995 | Bezama et al. | 257/467 |
| 5,469,329 | 11/1995 | Reddy et al. | 361/704 |
| 5,488,534 | 1/1996 | Rau et al. | 361/56 |
| 5,594,430 | 1/1997 | Cutter et al. | 340/825.31 |

*Primary Examiner*—Michael Horabik
*Assistant Examiner*—Anthony A. Asongwed
*Attorney, Agent, or Firm*—Oppenheimer Wolff & Donnelly LLP

[57] ABSTRACT

A tamper resistant electronic lock includes an internal tamper protection circuit and monitoring arrangement that thermally couples a transient voltage suppressor and a resettable fuse of the protection circuit to allow thermal feedback or interaction between the components and to substantially prevent overheating due to the application of overvoltage or out of tolerance current condition applied in an attempt to open the lock for unauthorized access purposes. A thermocouple is used to thermally couple the transient voltage suppressor and the resettable fuse, which acts to limit the current to a safe level when the transient voltage suppressor heats up upon application of the overvoltage or out of tolerance current conditions.

16 Claims, 6 Drawing Sheets

TAMPER RESISTANT ELECTRONIC LOCK AND METHOD OF USING SAME

TECHNICAL FIELD

The present invention relates in general to an improved electronic lock and a method of using it. The invention more particularly relates to a tamper resistant electronic lock and a method of using the lock to facilitate lock tamper detection.

BACKGROUND ART

There have been many different types and kinds of electronic locks and electronic protection devices for helping to protect and secure valuables. Such electronic devices must operate effectively and reliability and must be immune to electrically polluted environments including electrostatic discharges and power surges. Such devices must also be immune to the effects of tampering in order to prevent unwanted and unauthorized access to the secured valuables.

In order to protect electronic devices from sudden and unexpected power surges many electronic locks include some form of electronic protection that clamps transients while passing through different EMC homologation. Such protective devices are typically called transient voltage suppressors or simply a TVS.

Such suppressor devices are also utilized to help prevent unwanted and unauthorized access to small component, battery powered electronic locks. In this regard, the typical actuating device in a small component, battery powered electronic lock is usually a transistor driven device, such as small electronic motor or a solenoid, that operate at a low current of a half an ampere or less. Operationally then, the transistor driver is biased in a non-conductive state to conserve power and as such, is held in the non-conductive state by a constant bias voltage of about 5 volts. The TVS then helps clamp the voltage presented to the transistor driver at the desired bias voltage so an over voltage avalanche condition is avoided thereby allowing the solenoid to be actuated for opening the lock.

While a TVS may be suitable for clamping a transient power condition, a TVS is not designed to be immune from continuous overvoltage and or current out of tolerance conditions. Thus, the use of a TVS by itself is not immune to the effects of tampering.

More particularly, in the typical small component, battery powered electronic lock, power consumption must be minimal, which in turn dictates, that surge protection devices as well as lock actuating devises must also have low power ratings. Thus, application of a high constant current to a surge protection device will cause such a TVS to heat rapidly and explode due to rapid thermal expansion. Such a failure may under certain circumstances allow a theft to gain access to the valuables secured by the lock. In this regard, without a clamped bias voltage, a driver transistor may be subjected to an overvoltage avalanche condition as earlier mentioned.

In an attempt to overcome the problems associated with continuous overvoltage and or current out of tolerance conditions, some electronic devices and locks have incorporated in their protective circuits an in series slow blow fuse. A slow blow fuse is a one use passive device that must be replaced when it fails due to a continuous overvoltage and or current out of tolerance condition.

For example, application of a 2×9 volt overvoltage in one well known electronic lock causes the instantaneous failure of its safety fuse. Thus, while the fuse served its purpose by protecting the other electronic components within the lock, the lock is rendered useless until the fuse is replaced. Moreover, this type of tampering cannot be detected and may cause user concerns relative to the reliability of the lock or fuse circuit design should it happen on a regular basis.

Thus, while the addition of a slow blow fuse may be satisfactory for helping to protect a TVS from a high current, the slow blow fuse has not proven entirely satisfactory when employed for helping to detect lock tampering and sabotage.

Lock tampering, unlike lock sabotage, is an attempt to cause some specific component within the lock to fail by the application of an overvoltage or out of tolerance current condition so access through the lock to the otherwise secured protected valuables can be achieved.

From the perpetrator point of view, the tampering process should be undetected by the owner of the protective device. In this regard, the perpetrator desire no detection since the owner will be less likely to consider tampering as the means of achieving access to the protected goods. From the owner point of view, the lost of valuables will be unfortunate, but if detection is possible, the owner may be able to take additional precautionary steps, particularly if access was achieved by tampering with the electronic security device.

Unfortunately for the owner, clever unsuccessful tampering is difficult, if not impossible to detect. Moreover, should such tampering cause the protective fuse to fail while not preventing access through the lock, consumer confidence in electronic protective devices can be eroded.

In order to at least help deter the detrimental effects of sabotage and tampering, many electronic surge protection circuit utilize a resettable fuse, such as a POLYSWITCH (a registered trademark owned by Raychem Corporation located in Menlo Park, Calif.), that operates on the basis of a positive temperature coefficient. The resettable fuse in its normal state of operation has a low resistance. However, as soon as an out of tolerance current condition occurs, the resettable fuse will begin to heat and simultaneously will increase its resistance. In this regard, by increasing the resistance, the current passing to the other electronic components within the lock is limited to a safe level. Thus, unlike the slow blow fuse, the resettable fuse will not open circuit, but instead will merely limit the current passing to the other electronic components.

While a POLYSWITCH approach may help alleviate consumer concerns about lock and fuse reliability, the use of a resettable fuse in small component security locks has not proven entirely satisfactory with respect to tampering detection. In this regard, a resettable fuse has a slow response time and thus, is not effective when attempting to protect a TVS from thermal failure.

More particularly, as a resettable fuse is a thermally sensitive device, it must be designed within a given lock, to support certain maximum current values over a particular temperature range. Thus for example, in a typical small component electronic lock with an operating current of about 0.5 amperes, such a fuse would support a significantly greater current capacity at a 20° C. temperature as opposed to an 80° C. temperature. Design criteria would therefore dictate in a small component electronic lock that the resettable fuse pass at least 0.25 amperes but less than 1.5 amperes at a maximum operating temperature of 20° C.

A sophisticated thief knowing the operational characteristics of the POLYSWITCH in a 3 watt electronic lock would be able to easily determine that the maximum constant current the POLYSWITCH would support would be 0.25 amperes (3 watts/12 volts=0.25 amperes). Therefore the thief would be able to apply a low current of 0.25 amperes to the surge protection circuit, i.e. the TVS, without affecting the POLYSWITCH. As the TVS is not designed however, to handle such constant currents, a 0.25 amperes constant current at a sufficiently high voltage, would be sufficient to slowly cook the protective TVS until it fails in an open circuit condition.

Once the thief causes the TVS failure, the thief would then reduce the applied current (in order to protect the low wattage solenoid) and apply a sufficiently high voltage to now cause the driver transistor to fail in an avalanche condition. In the avalanche condition, the thief would then be able to decrease the voltage to a safe operating level followed by increasing the applied current to a sufficient amperage to activate the solenoid.

Therefore, it would be highly desirable to have a new and improved small component electronic lock that includes a tamper protection circuit that is effective against both short duration transient conditions and long duration overvoltage and or out of tolerance currents in order to protect the lock protected valuable from unauthorized access.

DISCLOSURE OF INVENTION

Therefore, the principal object of the present invention is to provide a new and improved small component electronic lock and a method of using it to prevent unauthorized access to protected valuables.

Another object of the present invention is to provide such a new and improved small component electronic lock that is manufactured using conventional small component manufacturing processes that are efficient, convenient and relatively inexpensive.

Briefly, the above and further objects of the present invention are realized by providing a new and improved tamper resistant electronic lock which facilitates the prevention of unauthorized and unwanted access to the lock protected valuables by lock tampering.

The tamper resistant lock includes in combination with a conventional electronic lock, an internal tamper protection circuit and mounting arrangement that facilitates the prevention of unauthorized and unwanted access to lock protected valuables by lock tampering. The conventional electronic lock includes an internal microprocessor, a microprocessor controlled driver circuit for actuating a mechanical locking mechanism, and a voltage regulator configured on a common printed circuit board substrate with the protective circuit. The conventional electronic lock also includes an external keypad for entry of lock access codes to the microprocessor.

The tamper protection circuit includes a POLYSWITCH and transient voltage suppressor mounted in close proximity to one another and thermally coupled together by the mounting arrangement to substantially prevent the overheating of the TVS in response to overvoltage and or out of current tolerance conditions.

BRIEF DESCRIPTION OF DRAWINGS

The above-mentioned and other objects and features of this invention and the manner of attaining them will become apparent, and the invention itself will be best understood by reference to the following description of the embodiments of the invention taken in conjunction with the accompanying drawings, wherein:

FIG. 1 which includes

BEST MODE FOR CARRYING OUT THE INVENTION

Figure 1A:
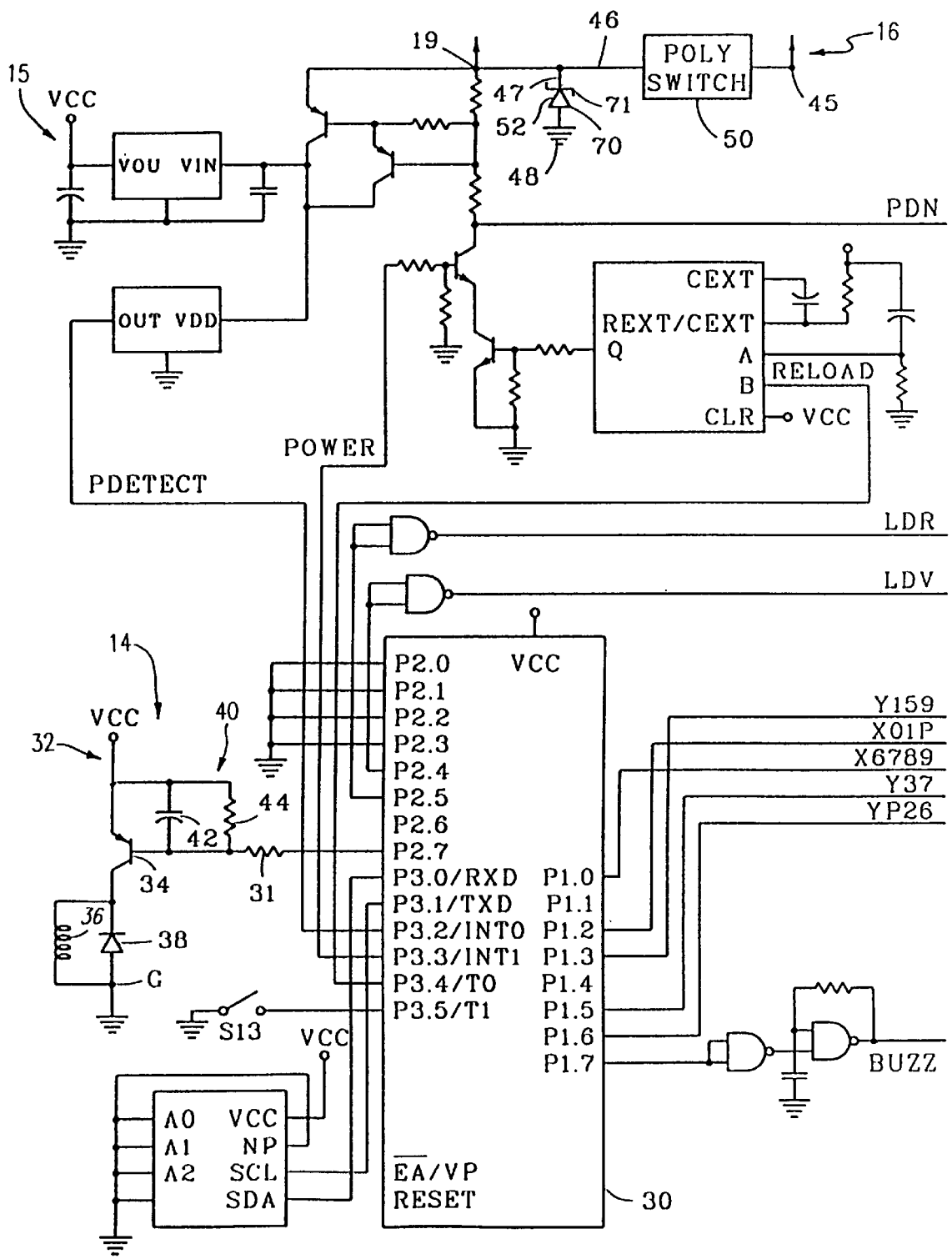
FIGS. 1a and 1b are electrical schematics of a tamper resistant electronic lock which is constructed in accordance with the present invention.
Figure 1B:
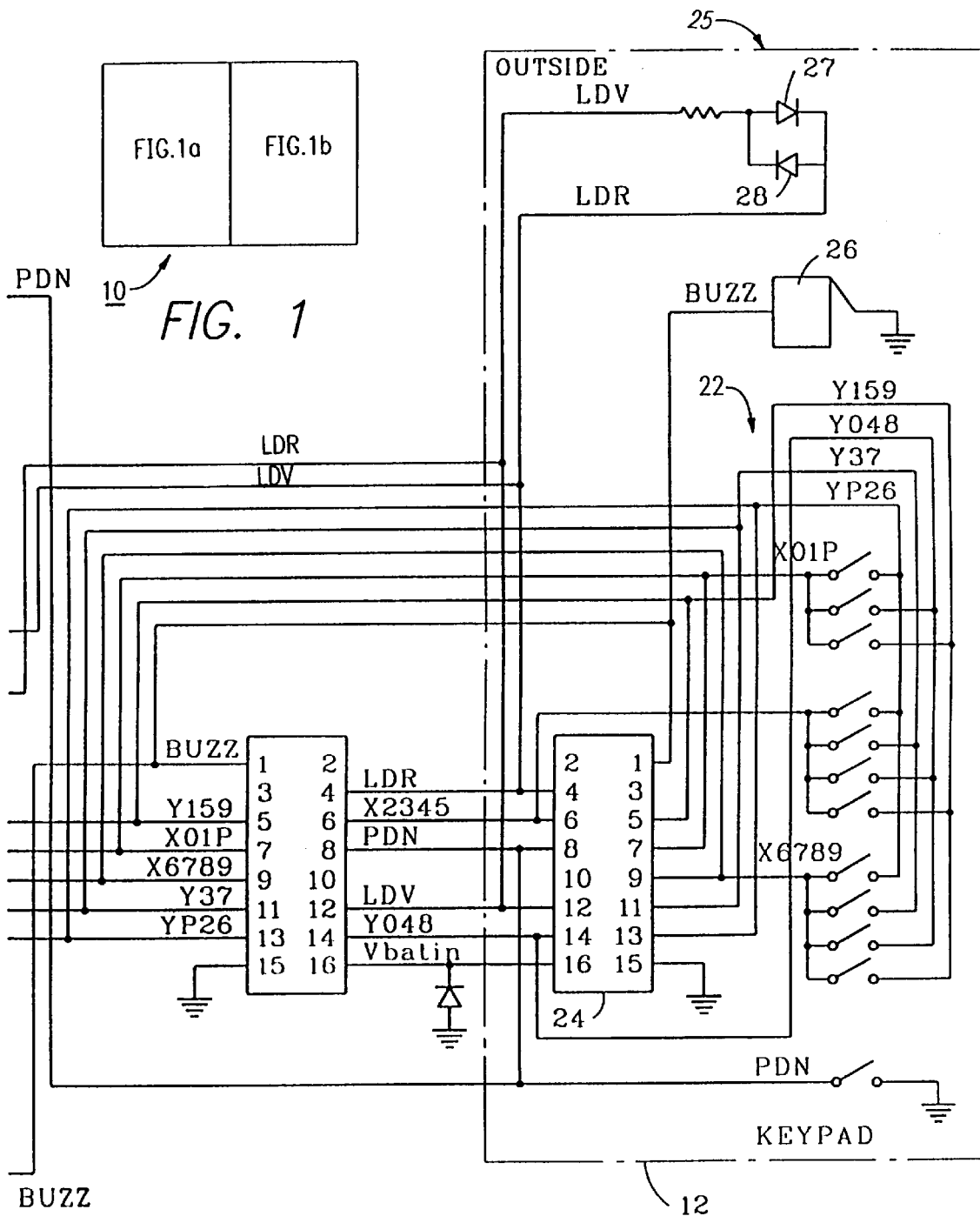

Referring now to the drawings and more particularly to FIG. 1 thereof, there is shown a tamper resistant electronic lock 10 which is constructed in accordance with the present invention. The lock 10 can be readily subjected to overvoltage and out of tolerance current conditions while preventing unauthorized tamper access in accordance with the novel preventing method of the present invention.

The tamper resistant electronic lock 10 generally comprises an lock housing (not shown) having a keypad 12 mounted externally thereto and an internally mounted low voltage, battery powered electronic actuation circuit 14 for energizing a solenoid drive circuit 32 with a sufficient amount of electrical power to cause the actuation of a solenoid driven latch (not shown) in response to access codes entered via the keypad 12.

Figure 2:
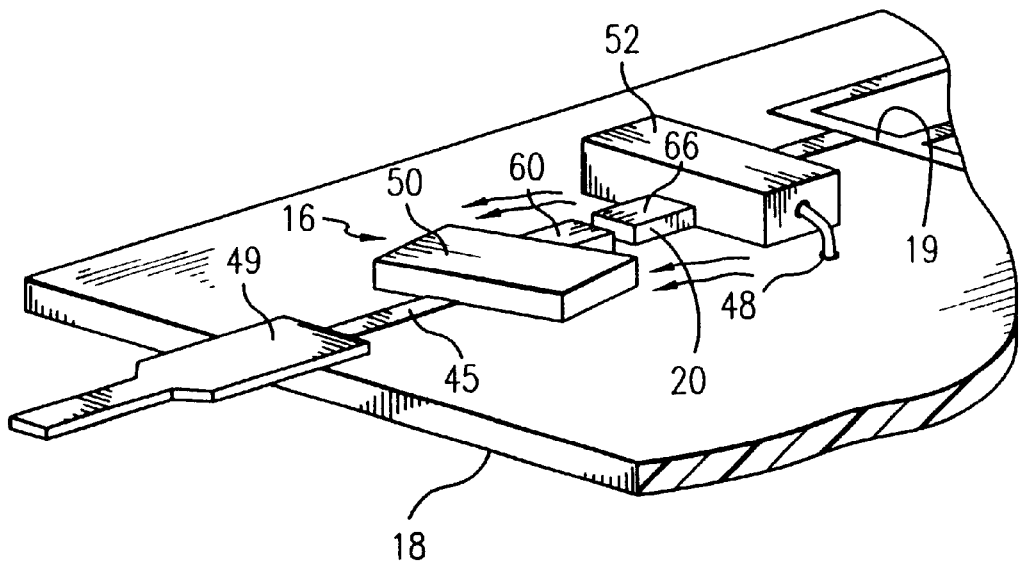
FIG. 2 is an diagrammatic illustration of a tamper protection circuit of FIG. 1.

In order to help protect the solenoid drive circuit 32 from overvoltage and out of tolerance current conditions the electronic lock 10 also includes a power regulation circuit 15 and a tamper protection circuit arrangement 16 which are both mounted internally within the lock housing on a common printed circuit board 18 (FIG. 2).

As best seen in FIG. 1, the power regulation circuit 15 is coupled electrically to the tamper protection circuit arrangement 16 via a common node 19 on the printed circuit board 18. The printed circuit board 18 supports the actuation circuit 14, the voltage regulation circuit 15 and the tamper protection circuit arrangement 16 within the interior of the lock housing.

As will be explained hereinafter in greater detail, a thermocouple structure 20 (FIG. 2) is also integrally connected to the printed circuit board 18 in order to facilitate heat transfer in the tamper protection circuit arrangement 16 in such a manner to enable the protection circuit arrangement 16 to be effective against both short duration electrical transient conditions and long duration overvoltage and or out of tolerance currents conditions applied to the lock 10 in attempts to gain unauthorized access to lock secure valuables.

From the foregoing it should be understood by those skilled in the art that voltage regulation circuit 15 and the tamper protection circuit arrangement 16, in combination with the thermocouple structure 20, cooperate together to help secure lock protected valuables from unauthorized access due to lock tampering.

In use, the tamper protection circuit arrangement 16 is responsive to normal battery current and voltage conditions allowing the actuation circuit 14 to respond to access code entered by a user (not shown) via the externally mounted keypad 12. In this regard, when the user enters a proper access code, the actuation circuit 14 responds to cause the solenoid drive circuit 32 to drive the solenoid driven latch between close and open positions permitting the user to have access to valuables (not shown) protected by the lock 10.

The tamper protection circuit arrangement 16 is also responsive to overvoltage and out of tolerance current conditions by clamping the input voltage to the voltage regulator circuit 15 so the voltage regulator circuit 15 will output a bias voltage $V_{cc}$ at a steady state level of about 5 volts. In this regard, should a thief seek apply an overvoltage to the lock 10 in order to attempt entrance to the valuables through the lock 10, the protective circuit arrangement 16 in combination with the thermocouple structure 20 will either disable the actuation circuit 14 in response to tamper voltage and current conditions or alternatively will immediately shut down the electrical paths between the voltage regulation circuit 15 and the protection circuit 16. In this manner the tamper protection arrangement 16 helps prevents the actuation circuit 14, from causing the solenoid driven latch to be actuated between its open and close positions.

From the foregoing it should be understood by those skilled in the art that the thermocouple structure 20 ensures that voltage and current levels are limited to acceptable values for the regulator 15 to protect the function of the lock.

Considering now the construction of the electronic lock 10 in greater detail, the keypad 12 generally includes a set of keys 22 coupled electrically to a connector 24 that interconnects signal wires from the interior portion of the lock 10 to the exterior keypad 12. A set of indicators 25 that includes a buzzer 26, and a pair of light emitting diodes 27–28 respectively which are all mounted externally to lock housing adjacent to the set of keys 22. The set of indicators 25 provide the user with indications of the entry of the proper access code and an audible sound when the solenoid driven latch is open for access purposes.

Considering now the electronic actuation circuit 14 in greater detail with reference to FIG. 1, the electronic actuation circuit 14 generally includes a microprocessor 30 for controlling the operation of the solenoid drive circuit 32 to cause the solenoid driven latch to be actuated between its open and close positions in response to access codes entered by the user. The operation of the electronic actuation circuit 14, voltage regulator circuit 15 and solenoid drive circuit 32 are conventional and well known to those skilled in the art. Accordingly, their operation will not be described in greater detail except for purposes of clarification in understanding the present invention.

Considering now the solenoid drive circuit 32 in greater detail with reference to FIG. 1, the solenoid drive circuit 32 generally includes a drive transistor 34 having its base coupled to an output actuate signal line P2.7 of the microprocessor 30 via a coupling resistor 31. The drive transistor 34 also has its collector connected to a solenoid coil 36 and diode 38 that are connected in parallel between the collector and a ground source mode (G). The emitter of the drive transistor 34 is connected directly to a bias voltage source ($V_{cc}$) and a bias network 40 including a capacitor 42 and resistor 44 connected in parallel between the emitter and base of the drive transistor 34.

In operation when the output actuate signal line P2.7 goes to a logical low level, the drive transistor 34 conducts a drive current of about 0.5 amperes to the solenoid coil 36 and the cathode of the diode 38, which in turn, causes the solenoid actuated latch to move to its open position. Conversely, when the output actuate signal line P2.7 goes to a logical high level, the drive transistor 34 is biased to a nonconductive state which blocks the flow of the drive current to the solenoid coil 36 and diode 38. When the drive current is blocked the solenoid actuated latch returns to its closed position prevent access to the valuables secured and protected by the lock 10.

Considering now the printed circuit board 18 in greater detail with reference to FIG. 2, the printed circuit board 18 is dimensioned for being received within the internal housing of the lock 10 and has a set of conventional pads for mounting electrical components thereto, such as the tamper protection circuit 16 and the microprocessor 30. In this regard, in order to interconnect the bias voltage $V_{cc}$ source to the tamper protection circuit and the microprocessor 30, the printed circuit board 18 includes a set of tamper circuit pads, such as the pads 45–46.

Figure 3:
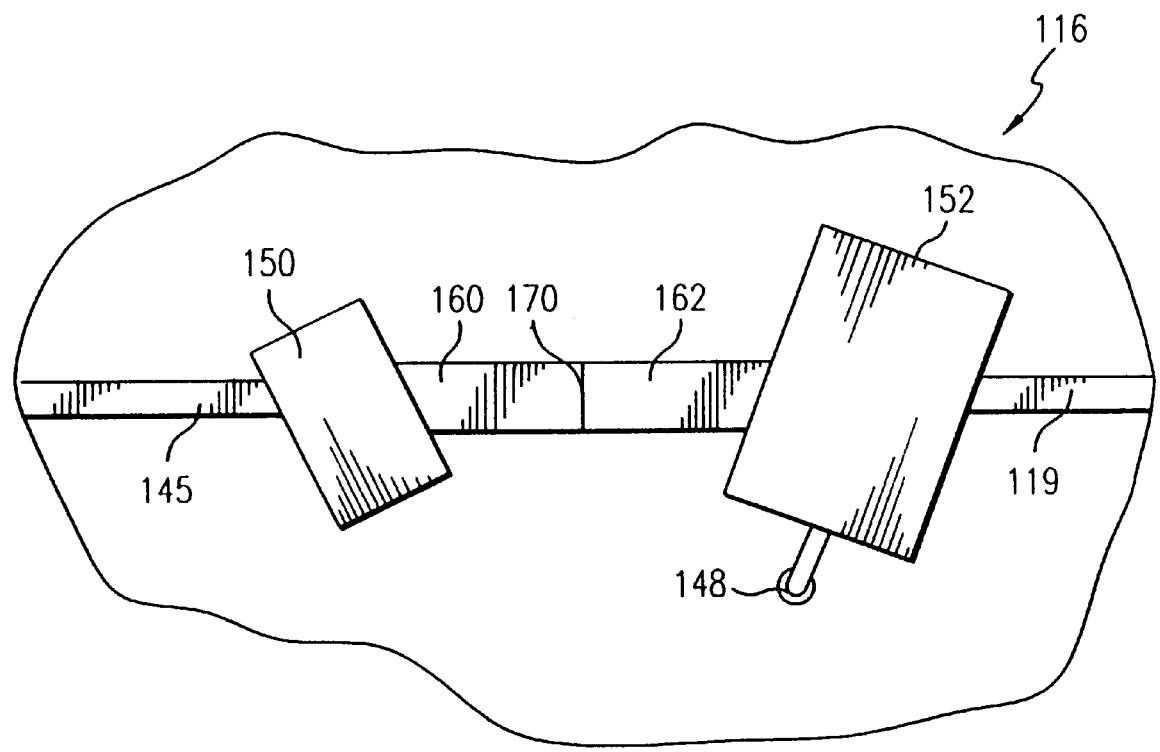
FIG. 3 is a diagrammatic illustration of another tamper protection circuit.

Considering now the tamper protection circuit 16 in greater detail with reference to FIGS. 1–3, the tamper protection circuit 16 is mounted to the printed circuit board 18 and generally includes a POLYSWITCH 50 and a transient voltage suppressor or zener diode 52 having an anode 70 and cathode 71.

The zener diode 52 is disposed with its cathode 71 connected to pad 47 and its anode 70 coupled to a ground source 48 via the printed circuit board 18. The POLYSWITCH 50 is connected at its input lead to the pad 45 for coupling the POLYSWITCH 50 to a power input pad 49. The output lead of the POLYSWITCH 50 is connected to pad 46 for coupling the POLYSWITCH 50 to the power regulation circuit 15 and to pad 47, which in turn is coupled to the cathode 71 of the zener diode 52.

Considering now the tamper protection circuit arrangement 16 in still greater detail with reference to FIG. 2, the polyswitch 50 and the transient voltage suppressor 52 are mounted closely spaced apart relative to the thermocouple structure 20 so that whenever the suppressor 52 is heated due to either transient or steady state overvoltage conditions the POLYSWITCH 50 will either limit the current supplied to the suppressor 52 or will trip causing an open circuit condition. Each of these cases will now be considered in greater detail.

A. Transient Conditions

The operation of the POLYSWITCH 50 in combination with the surge suppressor 52 function to limit the effect of a power surge on the lock 10. Such operation is well known to those skilled in the art. In this regard, transient overvoltage conditions will be clamped by the suppressor 52, while transient current conditions will be regulated by the POLYSWITCH 50.

B. Steady State Out of Tolerance Conditions

The POLYSWITCH 50 is a resistant device with a positive coefficient, such as a mini SMD050-2 device from Raychem, having the following specification:

| | |
|---|---|
| Nominal current | 0.5 amperes |
| Trip current | 1.0 amperes |
| Thermal resistance | $R_{Tp}$ = 200K/watt |
| Nominal resistance | $R_p$ = 0.6 ohm |

| | |
|---|---|
| Temperature in tripped state | $T_{Pd}$ = 125 K. |
| Constant power in tripped state | $P_{Pd}$ = 0.8 watt |

Figure 4:
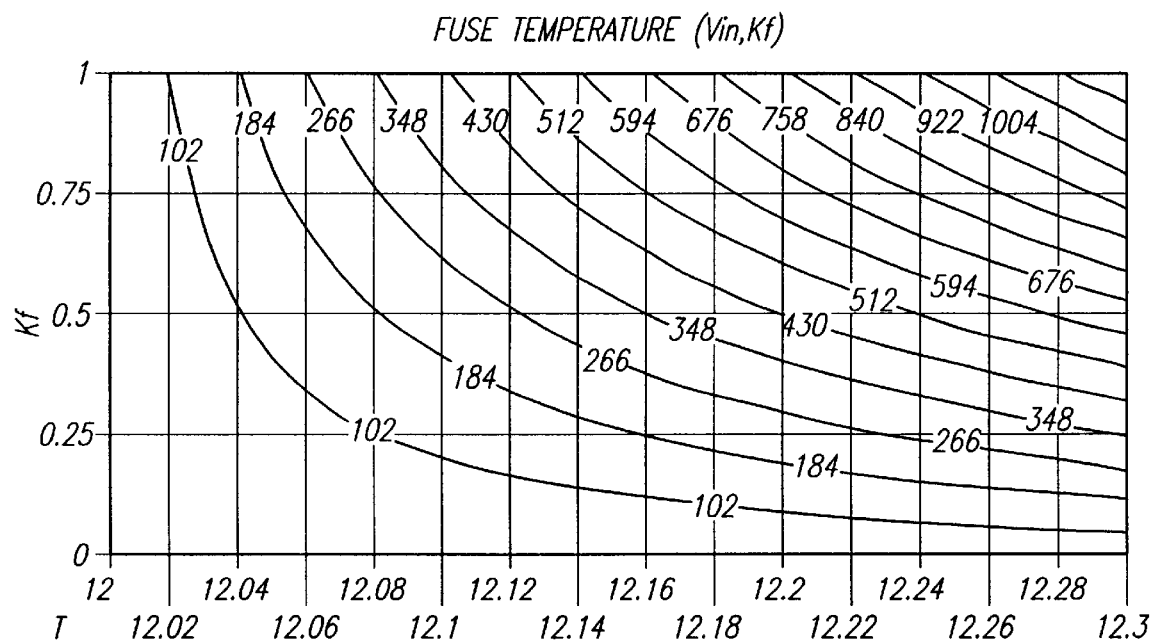
FIG. 4 is a graph illustrating a temperature vs. voltage relationship of a POLYSWITCH forming part of the tamper protection circuit of FIG. 1.
Figure 5:
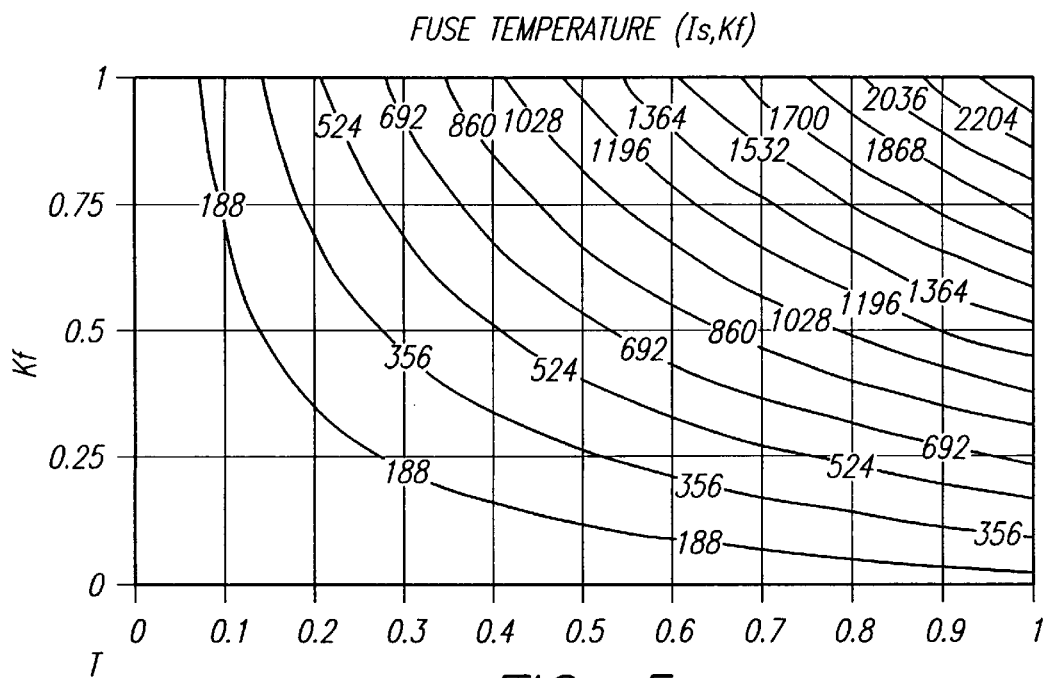
FIG. 5 is a graph illustrating a temperature vs. current relationship of the POLYSWITCH forming part of the tamper protection circuit of FIG. 1.

As the POLYSWITCH 50 is a resistant device the polyswitch 50 increases its resistance as it is heated due to the passage of current. Increasing the resistance of the POLYSWITCH 50 decreases the amount of current that passes through the device. The limiting of the current passing through the POLYSWITCH 50 in turn decreases the temperature of the POLYSWITCH 50. FIGS. 4 and 5 illustrate the effect of temperature on the POLYSWITCH 50 as a function of voltage and coefficient factor (FIG. 4) and as a function of current and coefficient factor (FIG. 5).

The temperature thermocouple factor equation for the POLYSWITCH 50 is given by the following equations:

$$T_p(V_{in}, K_f) = (V_{in} - V_c)^*(V_{in} - V_c + V_c K_f) R_{Tp}/R_p + T_A \qquad \text{Equation 1}$$

where $V_{in}$=input voltage;

$V_c$=clamp voltage of zener diode; and $K_f$=thermal coupling factor, where the $K_f$ value represents the part of the transient voltage suppressor power transmitted through the copper thermocouple structure 20 to the polyswitch 50.

In the ideal case, the whole power is transmitted 1→and when no power is transmitted 0→. Experience shows that the real $K_f$ value is between 0.50 and 0.75.

$$T_{pi}(I_{in}, K_f) = (R_p I_{in}^2 + K_f V_c I_{in}) R_{Tp} + T_A \qquad \text{Equation 2}$$

where $T_p$ (0.6 amp, 0.25)=423.2K i=0 . . . 30, j=0 . . . 10

$V_{in(i)} = V_c + i0.01$ volts $K_{f(j)} = j0.1$ and $T_{ij} = T_p(V_{ini}, K_{f(j)})$ In a transient condition then, the POLYSWITCH 50 will limit the amount of current passing to the suppressor 52, which will function quite well in clamping an overvoltage to about 12 volts where the suppressor 52 is specified to have a clamp voltage:

$V_c$=12 volts in response to an input voltage $V_{in}$ that is equal to or greater than 12 volts.

The suppressor 52 is a thermal device that is effective in dissipating only short burst of electrical engineering due to transient condition. In this regard, if the suppressor 52 is subjected to a steady state condition it will slowly heat when the input voltage is greater than 12 volts. Thus for example, if a steady state voltage of 13 volts is applied to the POLYSWITCH 50 at the rated 0.5 amperes current level, the POLYSWITCH 50 will operate quite well and will pass the current to the suppressor 52. In this regard, when the input voltage is at 13 volts with a steady state current of 0.5 amperes, a total power dissipation of 6.0 watts will occur as the suppressor 52 operates to clamp the input voltage to 12 volts. Such a high constant power dissipation if unchecked, would slowly cook the suppressor 52 until it fails in an open circuit condition.

Figure 6:
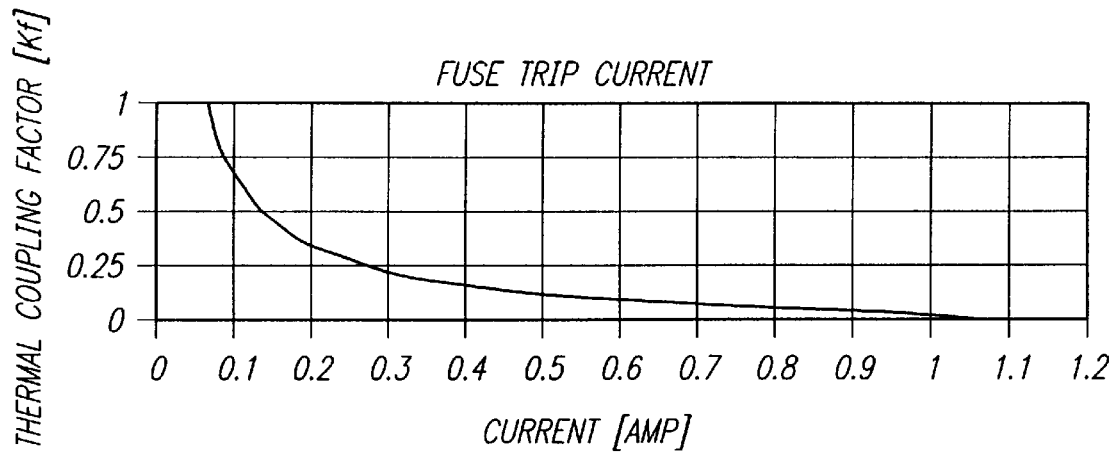
FIG. 6 is a graph illustrating a thermal couple factor vs trip current of the POLYSWITCH forming part of the tamper protection circuit of FIG. 1.

FIG. 6 illustrates the POLYSWITCH trip current as a function of a thermal coupling factor based on the power generated by the POLYSWITCH 50 and the power transmitted via the thermocouple structure 20, where $$P_{pd} = (V_{in} - V_c)^*(V_{in} - V_c + V_c^* K_f) 1/R_p \qquad \text{Equation 3}$$

$$V_{pd}(K_f) = -\frac{1}{2} R_p [-2/R_p^* V_c + 1/R_p^* V_c^* K_f((\sqrt{V_c^2 * K_f^2 + 4 P_{pd} R_p})/R_p)] \qquad \text{Equation 4}$$

$$I_{pd}(K_f) = ((V_{pd}(K_f) - V_c)/R_p) P_{cd}(K_f) = I_{pd}(K_f)^* V_c \qquad \text{Equation 5}$$

$K_f$=0,0.05 . . . 1

Figure 7:
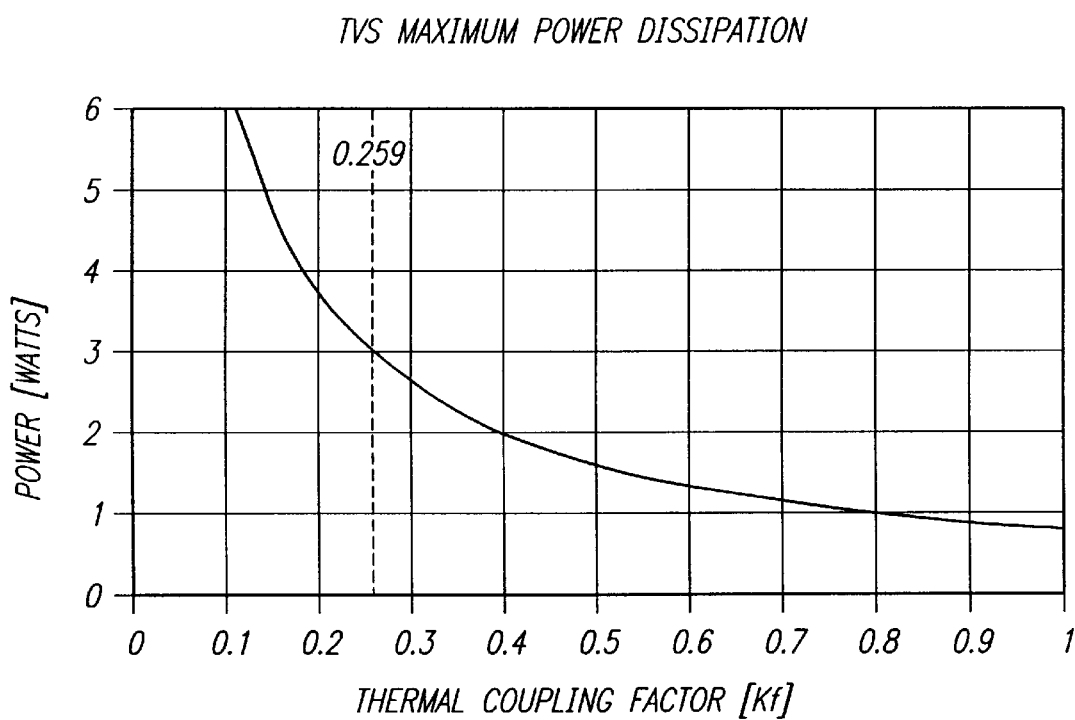
FIG. 7 is a graph illustrating a thermal couple factor vs maximum power dissipation of a transient power suppressor forming part of the tamper protection circuit of FIG. 1.

FIG. 7 illustrates the maximum power dissipation of the suppressor 52 as a function of the thermocouple factor $K_f$.

Figure 8:
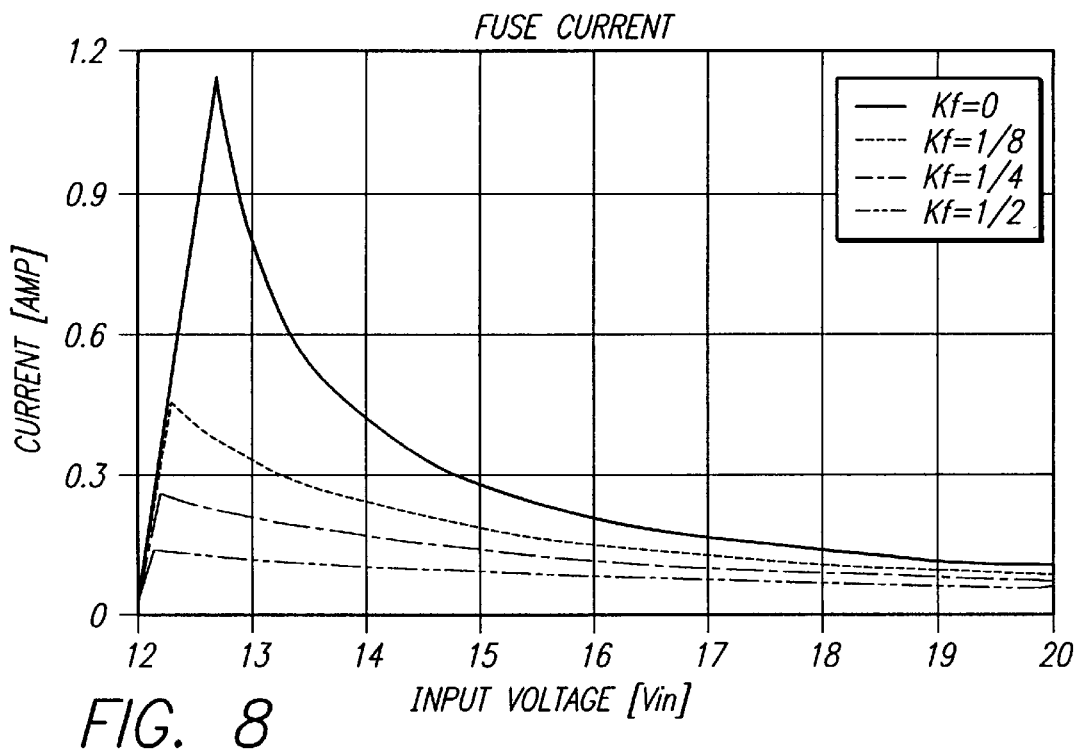
FIG. 8 is a graph illustrating POLYSWITCH current vs input voltage relative to different thermal couple factors.

In order to prevent the suppressor 52 from being overcooked, and thus, disabling its voltage clamping effect for protecting the solenoid drive circuit 32, the thermocouple structure 20 passes the dissipated heat from the suppressor 52 to the POLYSWITCH 50 causing it to heat as though it was passing a higher level of current. Such heating effect then causes the resistance value of the POLYSWITCH 50 to be increased, which in turn limits the amount of current passed to the suppressor 52, which it turn protects the suppressor 52 from thermal damage. FIG. 8 illustrates the power dissipation of the suppressor 52 in the absence of the thermocouple structure 20.

The current before and after the POLYSWITCH trips are given by equations 6–9.

$$I_s(V_{in}) = (V_{in} - V_c)/R_p \qquad \text{Equation 6}$$

where $I_s$ is current before the POLYSWITCH trips $$I_d(V_{in}^* K_f) = P_{pd}/(V_c(K_f - 1) + V_{in}) \qquad \text{Equation 7}$$

where $I_d$ is current after the POLYSWITCH trips $$I(V_{in}^* K_f) = \text{if } [V_{in} \geq V_{pd}(K_f), I_d(V_{in}, K_f), I_s/V_{in}] \qquad \text{Equation 8}$$

I is the circuit current $$P_c(V_{in}, K_f) = V_c^* I(V_{in}, K_f) \qquad \text{Equation 9}$$

where $P_c$ is the power dissipated by the transient voltage suppressor 52 where $V_{in} = V_c, V_c + 0.1$ volts ∴ 20 volts

From the foregoing, those skilled in the art should understand that the thermocouple structure 20 is sufficiently large to thermally couple the POLYSWITCH 50 and suppressor 52 together with a reasonable thermocouple factor of about 0.4 to reduce the power dissipation of the suppressor 52 to a safe level of about 2.0 watts. Thus, to assure the reliability of the suppressor 52 when it has a 3.0 watt rating, the minimum thermocouple factor $K_f$ value must be greater than about 0.259.

In the alternative, if a low voltage, high current is utilized, the POLYSWITCH 50 will heat up and trip sufficiently fast to prevent any damage to the suppressor 52. Moreover, if the current is to high the printed circuit board metallic conductor layer 63 between the POLYSWITCH 50 and the suppressor 52 may vaporize thus damaging the lock and preventing an unauthorized access. Such a failure condition is acceptable as the valuables protected by the lock remain secured.

Figure 9:
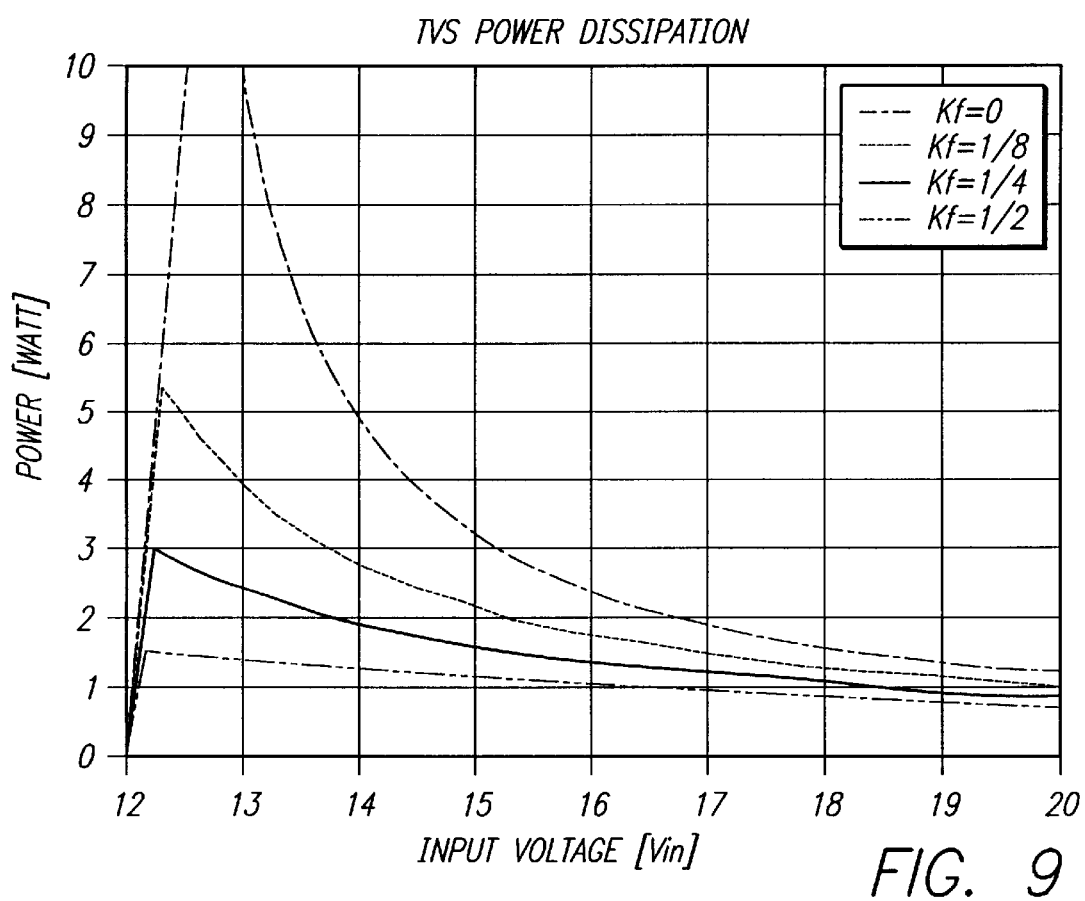
FIG. 9 is a graph illustrating the power dissipation of a transient voltage suppressor relative to input voltage with reference to different thermocouple factors.

It should be understood then in the absence of thermal coupling between the POLYSWITCH 50 and the transient voltage suppressor 52, e.g. $K_f$=0, the transient voltage suppressor 52 could be destroyed thermally by an applied voltage of about 12.6 volts. In this event, the power of the suppressor increases to about 12 watts, permitting temperatures of up to 400° C. Thus, by coupling the POLYSWITCH 50 and the suppressor 52 together thermally with a reasonable $K_f$ value of about 0.40, the power dissipated by the suppressor 52 is reduced to a safe level of about 2.0 watts. FIG. 9 is a graph illustrating the power dissipation of a transient voltage suppressor, such as suppressor 52, relative to input voltage with reference to different thermocouple factors.

Considering now the thermocouple structure 20 in greater detail with reference to FIG. 2, the thermocouple structure 20 generally includes a thick copper POLYSWITCH element 60 interconnected to a thick copper suppressor element 66 by the metallic conductor 63. Each of the elements 60, 66 are about 2 millimeters in thickness, and are integrally connected to the POLYSWITCH and suppressor pads 46 and 47 respectively.

In order to provide the proper thermocouple factor between the POLYSWITCH 50 and the suppressor 52, the overall length of the thermocouple structure is between about 0.5 mm and about 3.5 mm. A more preferred minimum distance is between about 1.0 mm and about 3.0 mm, while the preferred minimum distance is about 2.0 mm.

In another embodiment a protection circuit 116 is illustrated in FIG. 3 which is constructed in accordance with the present invention. The protection circuit 116 includes a POLYSWITCH 150 and transient surge suppressor 152 which are couple in series by a pair of cooper blocks 160 and 162 which are affixed to the POLYSWITCH 150 and the transient surge suppressor 152 respectively. The cooper blocks 160 and 162 are electronically and mechanically coupled together by a connector 170.

While a particular embodiment of the present invention has been disclosed, it is to be understood that various different modifications are possible and are contemplated within the true spirit and scope of the appended claims There is no intention therefore, of limitations to the exact abstract or disclosure herein presented.

I claim:

1. A tamper resistant electronic lock comprising:

electronic means having a low voltage power source for generating a sufficient amount of current to cause the lock to mechanically unlock;

said electronic means including decoding means for causing an access signal to be generated in response to a coded signal indicative of a correct access code;

activation means coupled to said low voltage power source and responsive to said access signal for mechanically unlocking the electronic lock; and tamper protection means coupled to said activation means for preventing the generation of said access signal in response to overvoltage and out of tolerance current conditions that otherwise cause the unauthorized generation of said access signal, said tamper protection means comprising a first thermally affected protection means and a second thermally affected protection means, wherein said first thermally affected protection means and said second thermally affected protection means are coupled by a thermal coupling means for providing a thermal feedback interaction between said first and second thermally affected protection means.

2. The tamper resistant electronic lock according to claim 1, wherein said tamper protection means includes:

a tamper protection circuit coupled between said activation means and said low voltage power source for causing an open circuit condition to substantially prevent the generation of said access signal in response to overvoltage and out of tolerance current conditions.

3. The tamper resistant electronic lock according to claim 2, wherein said tamper protection circuit includes:

a transient voltage suppressor for clamping overvoltage conditions to a predetermined low voltage substantially corresponding to a voltage value generated by said low voltage power source; and a current limiting device coupled electrically and thermally to said transient voltage suppressor and between said low voltage power source and said activation means for limiting a current to a sufficiently safe amperage to enable said activation means to properly respond to said access signal without damaging the lock.

4. The tamper resistant electronic lock according to claim 3, wherein:

said transient voltage suppressor responsive to said current limiting device clamping any overvoltage condition and generating thermal energy in response thereto;

said thermal energy having a sufficient value to cause said transient voltage suppressor to fail in an open circuit condition.

5. In combination with an electronic lock having an internal printed circuit board substrate and an external keypad, a tamper protection circuit, comprising:

a resettable fuse having a first positive thermal coefficient factor mounted to the printed circuit board substrate;

a transient voltage suppressor having a second positive coefficient factor mounted to the printed circuit board substrate;

a mounting arrangement for spacing said resettable fuse and said transient voltage suppressor in close proximity to one another so said resettable fuse and said transient voltage suppressor are spaced no less than about 2 millimeters from each other; and a thermocouple arrangement disposed between said transient voltage suppressor and said resettable fuse for coupling thermal energy from said transient voltage suppressor to said resettable fuse in a sufficient amount that said resettable fuse will limit the amount of current passed to said transient voltage suppressor to a safe level to prevent damaging said transient voltage suppressor.

6. A method of preventing lock access by tampering, comprising:

mounting a a resettable fuse having a positive thermal coefficient factor mounted to the printed circuit board substrate;

mounting a transient voltage suppressor having another positive coefficient factor to the printed circuit board substrate; and positioning a thermocouple arrangement between said transient voltage suppressor and said resettable fuse for coupling thermal energy from said transient voltage suppressor to said resettable fuse in a sufficient amount that said resettable fuse will limit the amount of current passed to said transient voltage suppressor to a safe level to prevent damaging said transient voltage suppressor.

7. The tamper resistant electronic lock according to claim 4, wherein said current limiting device is coupled to said transient voltage suppressor via a thermocouple.

8. The tamper resistant electronic lock according to claim 7, wherein said thermocouple comprises a first copper block and a second copper block, said second copper block coupled to said first copper block via a connector.

9. The tamper resistant electronic lock according to claim 8, wherein said connector is electrically conductive.

10. The tamper resistant electronic lock according to claim 9, wherein said activation means comprises a solenoid coil and a solenoid drive circuit coupled to said solenoid coil.

11. The tamper resistant electronic lock according to claim 10, wherein said decoding means comprises a microprocessor coupled to said activation means.

12. The tamper resistant electronic lock according to claim 11, wherein said transient voltage suppressor comprises a Zener diode.

13. The tamper resistant electronic lock according to claim 12, wherein said current limiting device comprises a resettable fuse.

14. The tamper resistant electronic lock according to claim 13, wherein said resettable fuse has a positive thermal coefficient factor.

15. The tamper protection circuit of claim 5, wherein said thermocouple arrangement comprises a first copper block and a second copper block, said second copper block coupled to said first copper block via a connector.

16. The tamper resistant electronic lock according to claim 15, wherein said connector is electrically conductive.

* * * * *